United States Patent
Okuyoshi et al.

(10) Patent No.: US 10,892,503 B2
(45) Date of Patent: Jan. 12, 2021

(54) FUEL CELL SYSTEM

(71) Applicant: TOYOTA JIDOSHA KABUSHIKI KAISHA, Toyota (JP)

(72) Inventors: Masahiro Okuyoshi, Okazaki (JP); Toshihiro Egawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 219 days.

(21) Appl. No.: 16/043,580

(22) Filed: Jul. 24, 2018

(65) Prior Publication Data

US 2019/0036140 A1 Jan. 31, 2019

(30) Foreign Application Priority Data

Jul. 27, 2017 (JP) ................................. 2017-145198

(51) Int. Cl.
*H01M 8/04746* (2016.01)
*H01M 8/04082* (2016.01)
(Continued)

(52) U.S. Cl.
CPC ..... *H01M 8/04761* (2013.01); *H01M 8/0494* (2013.01); *H01M 8/04097* (2013.01); *H01M 8/04104* (2013.01); *H01M 8/04201* (2013.01); *H01M 8/04231* (2013.01); *H01M 8/04388* (2013.01); *H01M 8/04402* (2013.01); *H01M 8/04753* (2013.01); *H01M 8/04932* (2013.01);
(Continued)

(58) Field of Classification Search
None
See application file for complete search history.

(56) References Cited

U.S. PATENT DOCUMENTS

| | | | |
|---|---|---|---|
| 2013/0071767 A1* | 3/2013 | Katano | H01M 8/04089 429/444 |
| 2016/0141659 A1 | 5/2016 | Yamamoto et al. | |
| 2018/0006319 A1 | 1/2018 | Asai | |

FOREIGN PATENT DOCUMENTS

| | | |
|---|---|---|
| JP | 2007-305563 | 11/2007 |
| JP | 2016-103465 | 6/2016 |

(Continued)

*Primary Examiner* — Jonathan Crepeau
*Assistant Examiner* — Angela J Martin
(74) *Attorney, Agent, or Firm* — Finnegan, Henderson, Farabow, Garrett & Dunner, LLP

(57) ABSTRACT

In a fuel cell system including a fuel cell, an anode gas supply channel, an anode gas discharge channel, an injector, a pressure sensor, and a controller, the controller controls the injector so that the pressure on the downstream side of the injector in the anode gas supply channel and does not become lower than target pressure, closes a discharge valve when the amount of discharged anode gas reaches a target discharge amount, the amount of discharged anode gas estimated based on the amount of decrease in the value of the pressure in a first period of the discharge valve open-period, the first period being a period from the point of time after the injector stops the injection and when variation of the pressure falls within a predetermined range to the point of time when the injector next starts the injection, and increases a ratio of the first period to the drive cycle by controlling, during the discharge valve open-period, at least one of the anode gas supply rate of the injector, the amount of electric power generated by the fuel cell, and the drive cycle of the injector.

10 Claims, 15 Drawing Sheets

(51) Int. Cl.
*H01M 8/0438* (2016.01)
*H01M 8/04089* (2016.01)
*H01M 8/04858* (2016.01)
*H01M 8/04223* (2016.01)
*H01M 8/04828* (2016.01)

(52) U.S. Cl.
CPC .......... *H01M 2250/20* (2013.01); *Y02E 60/50* (2013.01)

(56) References Cited

FOREIGN PATENT DOCUMENTS

| | | |
|---|---|---|
| JP | 2017-174534 | 9/2017 |
| WO | WO 2016/067789 | 5/2016 |

\* cited by examiner

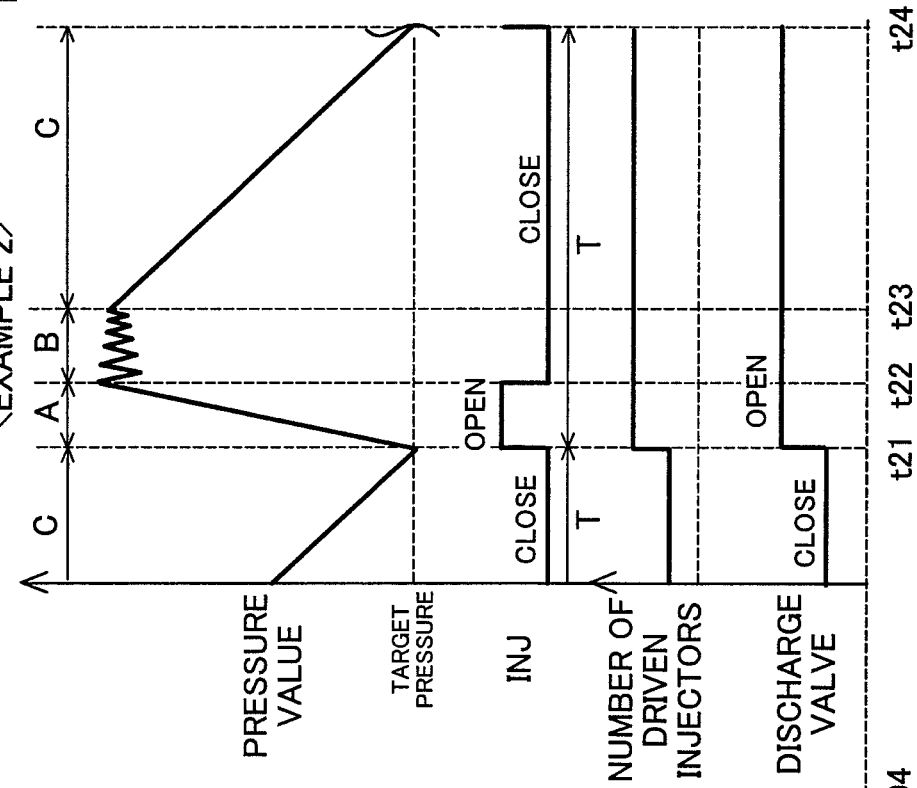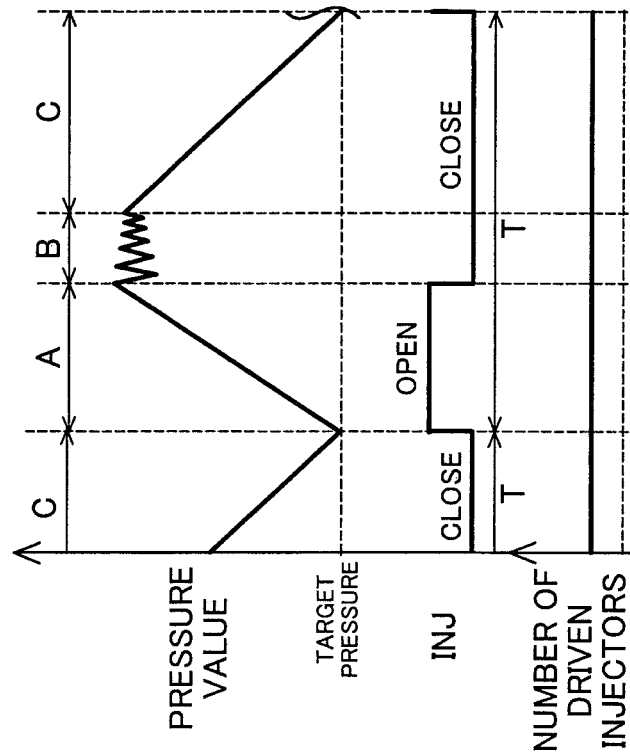
Fig.6

FUEL CELL SYSTEM

CROSS-REFERENCE TO RELATED APPLICATIONS

The present application claims the priority based on Japanese Patent Application No. 2017-145198 filed on Jul. 27, 2017, and the entire disclosure thereof is incorporated by reference in the present application.

BACKGROUND

Field

The present disclosure relates to a fuel cell system.

Related Art

There is a known fuel cell system that includes: an injector disposed in an anode gas supply channel through which an anode gas is supplied to the anode of a fuel cell; and a discharge valve disposed in an anode gas discharge channel through which an anode off gas is discharged from the fuel cell, and estimates the amount of discharged anode gas during the discharge valve open-period, based on the amount of pressure decrease in the anode gas supply channel (JP2016-103465A).

In the fuel cell system, intermittent injection of the anode gas from the injector causes the pressure on the downstream side of the injector to repeatedly increase and decrease also during the discharge valve open-period. In the system described in JP2016-103465A, during the discharge valve open period, the amount of discharged anode gas in the pressure increase period is estimated based on the pressure decrease rate in the pressure decrease period in the injector drive cycle.

In the system described in JP2016-103465A, however, there is room for improving the accuracy in the estimation of the amount of discharged anode gas.

SUMMARY

According to one aspect of the disclosure, a fuel cell system is provided. The fuel cell system includes: a fuel cell configured to generate electric power by receiving supply of an anode gas and a cathode gas; an anode gas supply channel connected to the fuel cell and through which the anode gas supplied to the fuel cell flows; an anode gas discharge channel connected to the fuel cell and through which the anode gas discharged from the fuel cell flows; an injector located on the anode gas supply channel and configured to inject the anode gas; a pressure sensor located on a downstream side of the injector in the anode gas supply channel or on the anode gas discharge channel; a discharge valve located on the anode gas discharge channel; and a controller configured to the injector and the discharge valve, and the controller is configured to control the injector so that pressure on the downstream side of the injector in the anode gas supply channel does not become lower than a predetermined target pressure, close the discharge valve when an amount of the anode gas discharged within a first period during a discharge valve open-period reaches a target discharge amount, the amount of discharged anode gas being estimated based on an amount of decrease in a pressure value acquired from the pressure sensor, the first period being a period from a point of time when a period after the injector stops injecting the anode gas until variation of the pressure acquired from the pressure sensor falls within a predetermined range elapses, to a point of time when the injector next starts injecting the anode gas, and increase a ratio of the first period to the drive cycle by controlling, during the discharge valve open-period, at least at least one of an anode gas supply rate of the injector, an amount of electric power generated by the fuel cell, and a drive cycle that is a period from start of the injection performed by the injector to next start of the injection.

According to the fuel cell system described above, increasing the ratio of the first period to the drive cycle allows improvement in the accuracy in the estimation of the amount of discharged anode gas.

The disclosure can also be implemented in various aspects other than the fuel cell system described above. For example, a method for allowing the fuel cell system to estimate the amount of discharged anode gas, a method for controlling the fuel cell system, a computer program for achieving the methods, a non-temporary recording medium that stores the computer program, and the like.

BRIEF DESCRIPTION OF THE DRAWINGS

FIG. 6 describes an effect provided by Process 2.

DETAILED DESCRIPTION

First Embodiment

Figure 1:
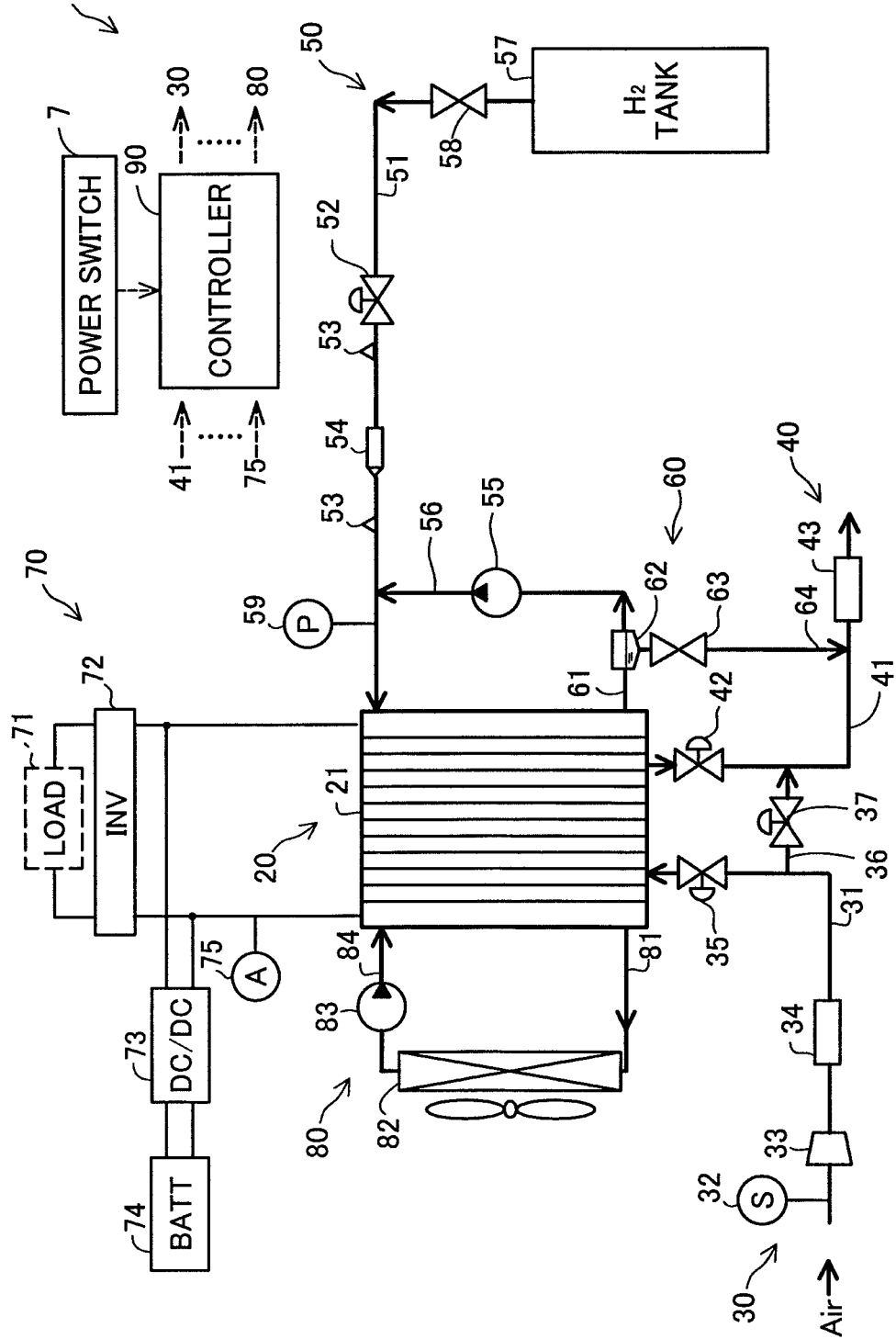
FIG. 1 shows a schematic configuration of a fuel cell system.

FIG. 1 shows a schematic configuration of a fuel cell system 100 as an embodiment of the present disclosure. The fuel cell system 100 is, for example, incorporated in a vehicle and outputs electric power that serves as a power source of the vehicle in accordance with a request from the driver.

The fuel cell system 100 includes a fuel cell stack 20, which includes a plurality of fuel cells 21, an anode gas supply system 50, an anode gas discharge system 60, a cathode gas supply system 30, a cathode gas discharge system 40, an electric power system 70, a cooling water circulation system 80, and a controller 90.

The fuel cell system 100 starts in response to the operation of turning on a power switch 7 and stops in response to the operation of turning off the power switch 7. The power switch 7 is an input interface for switching the state of the fuel cell system 100 between the stop state and the start state.

The fuel cells 21 each have a membrane electrode bonded element and two separators (not shown). The separators are plate-shaped substrates that not only sandwich the membrane electrode bonded element to form a channel for an anode gas, a cathode gas, and a coolant but function as a current collection plate. The membrane electrode bonded element includes an electrolyte membrane and electrodes formed on the surfaces of the electrolyte membrane. The electrolyte membrane is a solid polymer thin membrane showing good proton conductivity in a damp state. The electrode which forms each of the fuel cells and to which the anode gas is supplied is called an anode, and the electrode which forms each of the fuel cells and to which the cathode gas is supplied is called a cathode. In the present embodiment, the anode gas is hydrogen, and the cathode gas is air. The fuel cells 21 each generate electric power when supplied with the anode gas and the cathode gas.

The anode gas supply system 50 includes a hydrogen tank 57, an open/close valve 58, an anode gas supply channel 51, a regulator 52, relief valves 53, an injector 54, and a pressure sensor 59. The anode gas supply system 50 further includes a hydrogen pump 55 and a circulation channel 56. The anode gas discharge system 60 includes an anode gas discharge channel 61, a gas/liquid separating section 62, a discharge valve 63, and a discharge channel 64.

The hydrogen tank 57 stores hydrogen as the anode gas. The anode gas supply channel 51 is a channel which is connected to the fuel cell stack 20 and through which the anode gas to be supplied to the fuel cell stack 20 flows. The anode gas supply channel 51 is a pipe that connects the hydrogen tank 57 to the fuel cell stack 20. The open/close valve 58 is a valve that allows and blocks the supply of the anode gas from the hydrogen tank 57 to the anode gas supply channel 51 and is also called a main stop valve. The operation of opening and closing the open/close valve 58 is controlled by the controller 90.

The relief valves 53 are located on the anode gas supply channel 51 and open when the difference between the supply pressure and the atmospheric pressure reaches a threshold to emit the hydrogen into the atmosphere.

The injector 54 is located on the anode gas supply channel 51. The injector 54, when opened, injects the anode gas to supply the fuel cell stack 20 with the anode gas. The injector 54 is also called an anode gas injection device. The injector 54 is an electromagnetic open/close valve electromagnetically driven in accordance with a drive cycle set by the controller 90, the ratio of the injection period (valve open period) to the drive cycle, and the amplitude of pressure pulsation. The drive cycle is the period from the time when the injector 54 starts injecting the anode gas to the time when the injector 54 next starts injecting the anode gas. The anode gas injection performed by the injector 54 is hereinafter also called "injection performed by injector 54." The pressure pulsation means that the pressure on the downstream side of the injector 54 repeatedly increases and decreases when the injector 54 performs and stops the injection. The amplitude of the pressure pulsation is the amplitude of the pressure value on the downstream side of the injector 54. The amplitude of the pressure value is the difference between the median and the maximum of the oscillating pressure value on the downstream side of the injector 54 in the drive cycle of the injector 54. The injector 54 is so controlled by the controller 90 that the pressure in the anode gas supply channel 51 between the injector 54 and the fuel cell stack 20 does not become lower than a predetermined target pressure value.

The regulator 52 is provided on the upstream side of the injector 54 in the anode gas supply channel 51. The regulator 52 adjusts the primary pressure acting on the injector 54 under the control of the controller 90. The primary pressure acting on the injector 54 is the pressure in the anode gas supply channel 51 between the regulator 52 and the injector 54. The regulator 52 is also called a "pressure adjusting valve."

The anode gas discharge channel 61 is a channel which is connected to the fuel cell stack 20 and through which an anode off gas discharged from the fuel cell stack 20 flows. The anode gas discharge channel 61 is a pipe that connects the anode gas outlet of the fuel cell stack 20 to the gas/liquid separating section 62.

The gas/liquid separating section 62 is located on the anode gas discharge channel 61. The gas/liquid separating section 62 is a container for separating gas and water having flowed thereinto through the anode gas discharge channel 61 from each other. The gas/liquid separating section 62 is located on a vertically lower portion of the anode gas discharge channel 61 and separates gas and liquid discharged via the anodes from each other with the aid of gravity. The gas separated by the gas/liquid separating section 62 is primarily the anode gas having been unconsumed and discharged, nitrogen having passed through the cathode via the membrane electrode bonded element located on each of the fuel cells 21, and moisture (water vapor) not having been separated by the gas/liquid separating section 62. The gas/liquid separating section 62 is provided with a water level sensor that measures the level of the water in the gas/liquid separating section 62. The water level sensor transmits the result of the measurement to the controller 90.

The circulation channel 56 is a pipe that causes the anode gas supply channel 51 and the anode gas discharge channel 61 to communicate with each other. The circulation channel 56 is connected to the anode gas supply channel 51 on the side downstream of the injector 54. The circulation channel 56 is provided with the hydrogen pump 55. The hydrogen pump 55 re-supplies the fuel cell stack 20 with the gases separated by the gas/liquid separating section 62. The gases separated by the gas/liquid separating section 62 are primarily the anode gas having been unconsumed and discharged, the nitrogen having passed through the cathode via the membrane electrode bonded element located on each of the fuel cells 21, and the moisture not having been separated by the gas/liquid separating section 62. The hydrogen pump 55 is also called an "anode gas pump." Since the anode gas flowing through the circulation channel 56 is supplied to the fuel cell stack 20 through the anode gas supply channel 51, the circulation channel 56 may be considered as part of the anode gas supply channel 51.

The discharge channel 64 is a pipe that connects the gas/liquid separating section 62 to a cathode gas discharge channel 41 (which will be described later), which is located on the cathode gas discharge system 40. The discharge valve 63 is located on the discharge channel 64. The discharge valve 63 is basically closed for improvement in fuel consumption. The discharge valve 63 opens at a preset discharge timing under the control of the controller 90.

The pressure sensor 59 is provided downstream of the injector 54 in the anode gas supply channel 51. In the present embodiment, the pressure sensor 59 is located on the anode gas supply channel 51 between the injector 54 and the fuel cell stack 20. The pressure sensor 59 measures the pressure value and transmits the result of the measurement to the controller 90. The pressure sensor 59 may instead be located on the anode gas discharge channel 61 or the circulation channel 56.

The cathode gas supply system 30 includes a cathode gas supply channel 31, an air flow meter 32, a compressor 33, an intercooler 34, an inlet valve 35, a bypass channel 36, and a bypass valve 37. The cathode gas discharge system 40 includes the cathode gas discharge channel 41, a pressure adjusting valve 42, and a muffler 43.

The cathode gas supply channel 31 is a pipe that connects the fuel cell stack 20 to the atmosphere-side port of the cathode gas supply channel 31. The cathode gas discharge channel 41 is a pipe that connects the fuel cell stack 20 to the atmosphere-side port of the cathode gas discharge channel 41. The bypass channel 36 is a pipe that branches off the cathode gas supply channel 31 from a point on the upstream side of the fuel cell stack 20 and is connected to the cathode gas discharge channel 41.

The air flow meter 32 measures the amount of cathode gas flowing through the cathode gas supply channel 31. The compressor 33 is located on the cathode gas supply channel 31. The position where the compressor 33 is provided is a position shifted from the position where the cathode gas supply channel 31 and the bypass channel 36 are connected to each other toward the atmosphere-side port. The compressor 33 sucks the cathode gas through the atmosphere-side port of the cathode gas supply channel 31 and compresses the cathode gas. The intercooler 34 is a device for lowering the temperature of the cathode gas compressed by the compressor 33.

The inlet valve 35 is located on the cathode gas supply channel 31 and in a position shifted from the position where the cathode gas supply channel 31 and the bypass channel 36 are connected to each other toward the fuel cell stack 20. The inlet valve 35 adjusts the channel cross-sectional area of the cathode gas supply channel 31 in accordance with the opening of the input valve 35 under the control of the controller 90.

The bypass channel 36 is a pipe that connects the cathode gas supply channel 31 to the cathode gas discharge channel 41. The bypass channel 36 is provided with the bypass valve 37. The bypass valve 37 adjusts the channel cross-sectional area of the bypass channel 36 in accordance with the opening of the bypass valve 37 under the control of the controller 90. The pressure adjusting valve 42 is located on the cathode gas discharge channel 41 and in a position shifted from the position where the cathode gas discharge channel 41 and the bypass channel 36 are connected to each other toward the fuel cell stack 20. The pressure adjusting valve 42 adjusts the channel cross-sectional area of the cathode gas discharge channel 41 in accordance with the opening the pressure adjusting valve 42 under the control of the controller 90. The muffler 43 is a noise attenuating device that attenuates noise produced when the discharge gas is discharged. The anode off gas having passed through the pressure adjusting valve 42 is discharged via the muffler 43 through the atmosphere-side port into the atmosphere.

The cooling water circulation system 80 cools the fuel cell stack 20. The cooling water circulation system 80 includes a cooling water discharge channel 81, a radiator 82, a cooling water pump 83, and a cooling water supply channel 84.

The cooling water discharge channel 81 is a channel that connects the fuel cell stack 20 to the radiator 82 and is a pipe through which cooling water is discharged from the fuel cell stack 20.

The radiator 82 is provided with a radiator fan. The heat dissipation performed by the radiator 82 is expedited with air delivered from the fan. The cooling water supply channel 84 is a channel that connects the radiator 82 to the fuel cell stack 20 and is a pipe through which the cooling water is supplied to the fuel cell stack 20. The cooling water pump 83 is located on the cooling water supply channel 84 and circulates the cooling water.

The electric power system 70 includes an inverter 72, a DC-DC converter 73, a battery 74, and a current sensor 75.

The inverter 72 is connected in parallel to the fuel cell stack 20 and the battery 74, converts DC current supplied from the fuel cell stack 20 or the battery 74 into AC current, and supplies a load device 71 with the AC current. The DC-DC converter 73 not only raises the voltage outputted from the battery 74 and supplies the inverter 72 with the output voltage but lowers the voltage outputted from the fuel cell stack 20 and supplies the battery 74 with the output voltage to accumulate excess electric power generated by the fuel cell stack 20. The DC-DC converter 73 controls the current and voltage of the electric power generated by the fuel cell stack 20 based on a current request value transmitted from the controller 90. The current request value is a target value of the current of the electric power generated by the fuel cell stack 20 and is determined by the controller 90. The current sensor 75 measures the value of the current outputted from the fuel cell stack 20 during the power generation and transmits the result of the measurement to the controller 90.

The controller 90 is configured as a computer including a CPU and a memory and is specifically an electronic control unit (ECU). The controller 90 outputs signals for controlling the action of the fuel cell system 100 to the portions thereof. The controller 90 controls the portions of the fuel cell system 100 to carry out the process of opening/closing the discharge valve 63, that is, the process of opening the discharge valve 63 when a condition that allows opening of the discharge valve 63 is satisfied and closing the discharge valve 63 when an estimated amount of anode gas discharged via the discharge valve 63 reaches a target discharge amount. The controller 90 estimates the amount of discharged anode gas based on the amount of decrease in the pressure value acquired from the pressure sensor 59.

Figure 2:
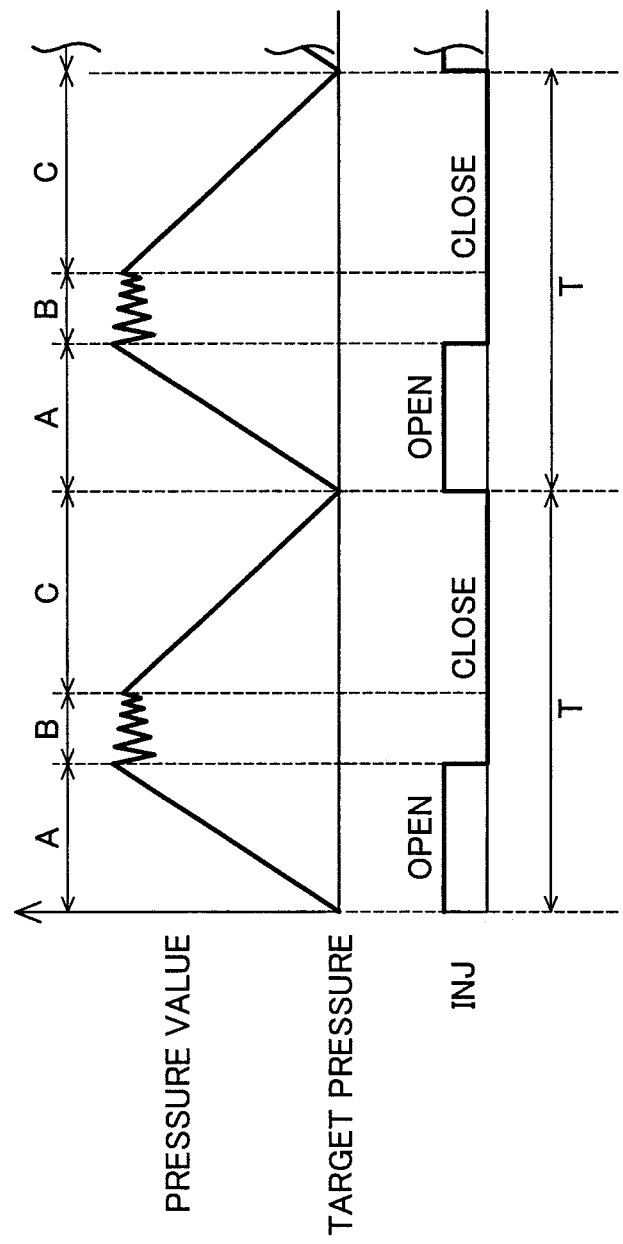
FIG. 2 shows a pressure value measured with a pressure sensor.

During the opening of the discharge valve 63, FIG. 2 is a conceptual diagram showing variation of the pressure measured with the pressure sensor 59. FIG. 2 shows the pressure value and the injection (OPEN) and no-injection (CLOSE) performed by the injector 54 along the horizontal axis that represents time. The injection and non-injection performed by the injector 54 shown in FIG. 2 stand for an "ON" signal and an "OFF" signal from the controller 90, respectively. The pressure value on the downstream side of the injector 54 increases in the period for which the injector 54 performs the injection (period A). The pressure value does not decrease immediately after the injector 54 stops the injection but undergoes a transition period in which the pressure value repeatedly increases and decreases after the injector 54 stops the injection and then decreases. The period after the injector 54 stops the injection but until the variation in the pressure value falls within a predetermined range is also called a "period B." The predetermined range is, for example, so set that the variation in the pressure value per unit time is 1 kPa at the maximum. In other examples, the predetermined range is so set that the variation in the pressure value per unit time is 3 kPa, 5 kPa, or 10 kPa at the maximum. The period after the period B elapses but until the injector 54 next starts the injection is also called a "period C" or a "first period."

Since the decrease in the pressure value in the period C reflects the decrease in the pressure resulting from the opening of the discharge valve 63, a prolongation of the period C in the drive cycle improves the accuracy in the estimation of the amount of discharged anode gas. The controller 90 controls the portions of the fuel cell system 100 in the process of opening/closing the discharge valve 63 to increase the ratio of the period C to the drive cycle of the injector 54. The process of opening/closing the discharge valve 63 carried out in the fuel cell system 100 will be specifically described below.

Figure 3:
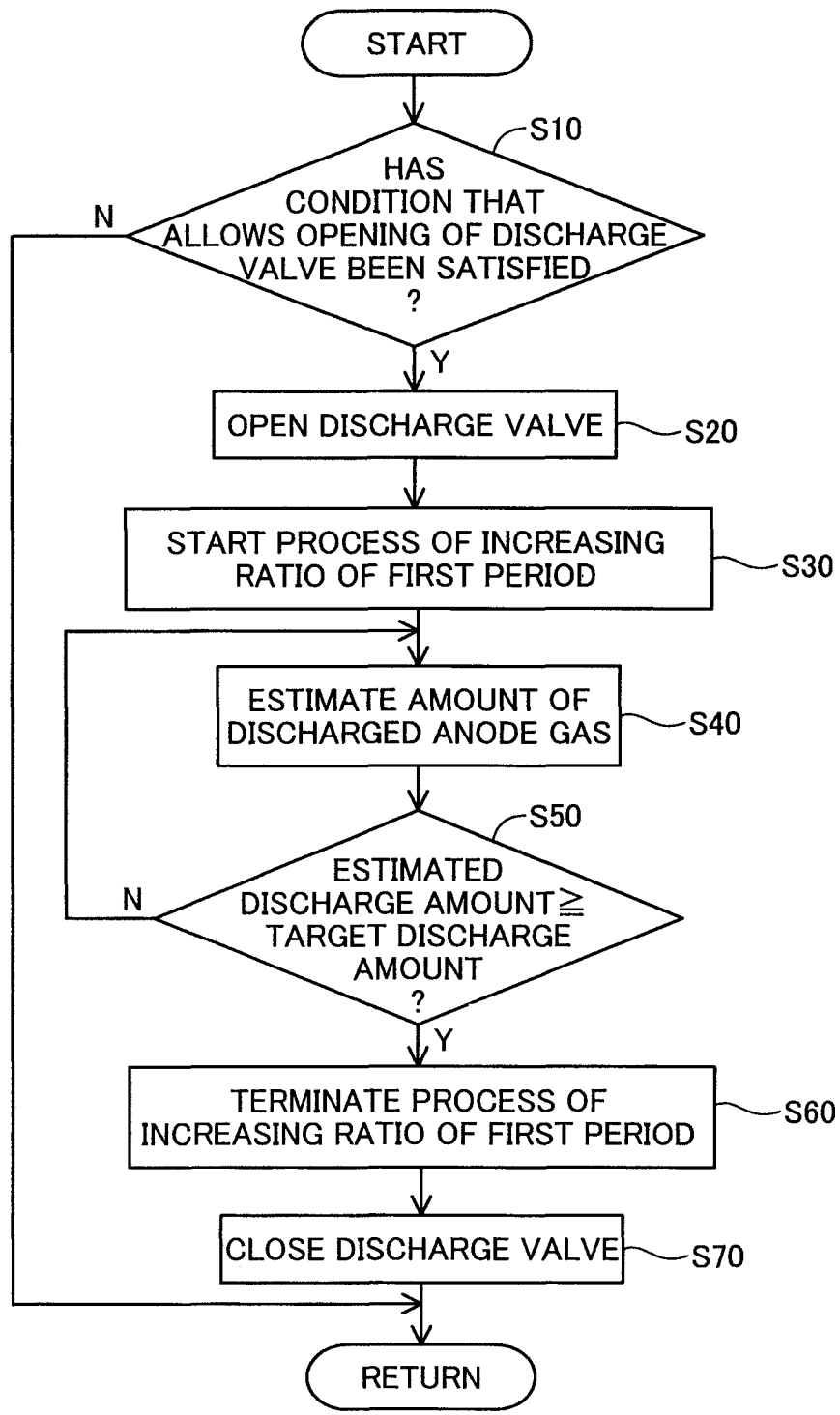
FIG. 3 is a flowchart showing the discharge valve open/close process carried out by the fuel cell system.

FIG. 3 is a flowchart showing the process of opening/closing the discharge valve 63 carried out by the fuel cell system 100. The opening/closing process is a process repeatedly carried out by the controller 90 during the operation of the fuel cell system 100.

The controller 90 first evaluates whether or not the condition that allows opening of the discharge valve 63 is satisfied (step S10). The condition that allows opening of the discharge valve 63 is, for example, a state in which the amounts of water, hydrogen, and nitrogen in the anode gas discharge channel 61 or the gas/liquid separating section 62 reach respective reference values.

In a case where the condition that allows opening of the discharge valve 63 is satisfied (YES in step S10), the controller 90 opens the discharge valve 63 (step S20). When the discharge valve 63 is opened, reserved water is discharged, and the anode gas is subsequently discharged.

The controller 90 then starts the process of increasing the ratio of the first period (period C) (step S30). The controller 90 carries out at least one of Processes 1 to 6, which will be described later, to increase ratio of the first period. The process of increasing the ratio of the first period will be described later in detail.

The controller 90 then estimates the amount of discharged anode gas based on the amount of decrease in the pressure value in the first period (period C) acquired from the pressure sensor 59 (step S40). The controller 90 may start the estimation of the amount of discharged anode gas from the point of time when the discharge of the reserved water in the gas/liquid separating section 62 is completed. The controller 90 can determine that the discharge of the reserved water is completed based on the result of the measurement performed by the water level meter in the gas/liquid separating section 62.

In the estimation of the amount of discharged anode gas, the controller 90 determines based on whether or not the period B described above has elapsed that the period C has started. The length of the period B is roughly constant irrespective of the drive cycle of the injector 54, the amplitude of the pressure pulsation, and other factors. The controller 90 may store the length of the period B determined based on an experiment or a simulation, perform counting after the period A ends, that is, after the injector 54 stops the injection, and determine the point of time when the period B has elapsed to be the point of time when the period C starts. Instead, the controller 90 may determine the point of time when the oscillating pressure value acquired from the pressure sensor 59 after the period A ends falls within the pre-specified range stored in the controller 90 to be the point of time when the period C starts.

In the present embodiment, the controller 90 estimates the amount of discharged anode gas as follows: The controller 90 stores a map representing the relationship between the output current value representing the amount of electric power generated by the fuel cell stack 20 and the amount of consumed anode gas. The controller 90 first inputs the current value acquired from the current sensor 75 into the map to calculate the amount of anode gas consumed by the fuel cell stack 20. The controller 90 subtracts the amount of consumption from the amount of the anode gas flow, which is based on the result of multiplication of the amount of pressure decrease and the volume of the anode gas channel on the downstream side of the injector 54, and sets the result of the subtraction to be the amount of discharged anode gas. The controller 90 may calculate the amount of discharged anode gas throughout the period A to the period C by assuming that the amount of pressure decrease in the period C is equal to the amount of pressure decrease in the periods A and B, which follow the period C.

The controller 90 then evaluates whether or not the estimated amount of discharged anode gas is greater than or equal to the target discharge amount (step S50). The target discharge amount is the amount of discharged anode gas that does not result in deterioration of the fuel consumption due to an increase in the amount of discharged anode gas, a decrease in the voltage across the fuel cell stack 20 due to an increase in the concentration of impurities in the anode gas, and other disadvantageous phenomena. The target discharge amount may be stored in the controller 90 in advance or may be determined by the controller 90 based on the measurement results acquired, for example, from the water level sensor and a gas concentration sensor located on the anode gas discharge channel 61 and the reference values of the water, hydrogen, and nitrogen in the gas/liquid separating section 62.

In a case where the amount of discharged anode gas is smaller than the target discharge amount (NO in step S50), the controller 90 returns to the process of estimating the amount of discharged anode gas (step S40) and accumulates the amount of discharged anode gas. In a case where the amount of discharged anode gas is greater than or equal to the target discharge amount (YES in step S50), the controller 90 resets the cumulative amount of discharged anode gas and terminates the process of increasing the ratio of the first period (step S60) and closes the discharge valve 63 (step S70). The controller 90 repeats the processes in steps S10 to S70 described above during the operation of the fuel cell system 100.

The process of increasing the ratio of the first period (step S30) only needs to start after the condition that allows opening of the discharge valve 63 is satisfied (YES in step S10) but before the process of estimating the amount of discharged anode gas (step S40) or may be carried out, for example, concurrently with the opening of the discharge valve 63. The process of increasing the ratio of the first period may be terminated concurrently with or after the closing of the discharge valve 63 (step S70).

According to the present embodiment, increasing the ratio of the first period in the drive cycle of the injector 54 allows improvement in the accuracy in the estimation of the amount of discharged anode gas.

A variety of processes of increasing the ratio of the first period will be specifically described below.

Process 1

In Process 1, the controller 90 controls the regulator 52 to increase the primary pressure acting on the injector 54 in the period for which the discharge valve 63 is open as compared with the primary pressure in the period for which the discharge valve 63 is closed. For example, the controller 90 increases the primary pressure acting on the injector 54, for example, by 0.2 Mpa when or immediately before the discharge valve 63 is opened as compared with the primary pressure in the period for which the discharge valve 63 is closed. The controller 90 further controls the injector 54 so that the drive cycle in the period for which the discharge valve 63 is closed is equal to the drive cycle in the period for which the discharge valve 63 is open.

Figure 4:
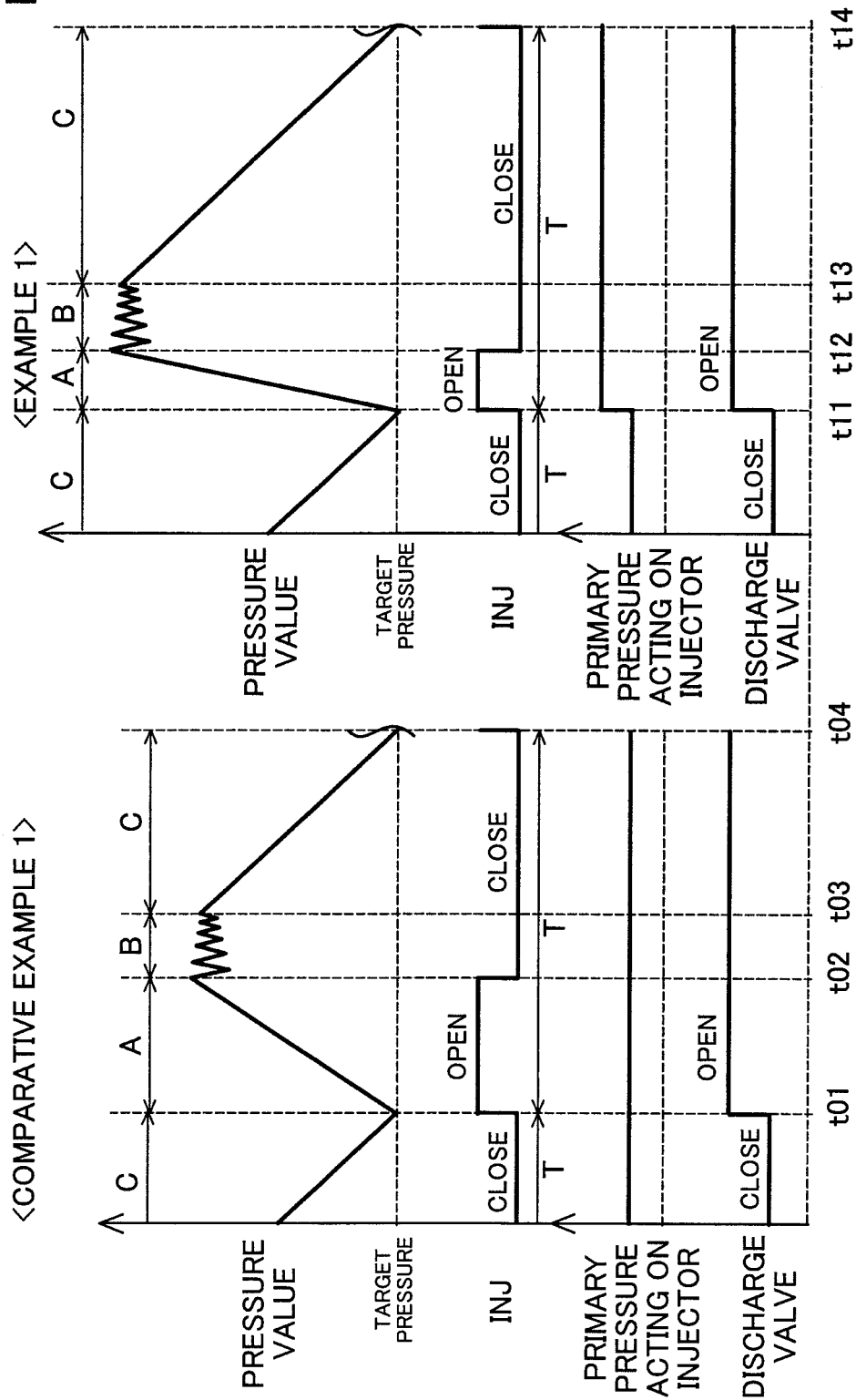
FIG. 4 describes an effect provided by Process 1.

FIG. 4 describes an effect provided by Process 1. FIG. 4 is a timing chart showing the pressure value acquired from the pressure sensor 59, opening or closing of the injector 54, the primary pressure acting on the injector 54, and opening or closing of the discharge valve 63 in Comparative Example 1, in which Process 1 is not carried out, and Example 1, in which Process 1 is carried out. In Comparative Example 1, the primary pressure in the injector 54 is constant irrespective of whether the discharge valve 63 is open or closed.

In Example 1 and Comparative Example 1, the timing when the discharge valve 63 is opened coincides with the timing when the injector 54 starts the injection, but not necessarily. The same holds true for the description of the following Processes 2 to 6.

During the opening of the discharge valve 63, the pressure on the upstream side of the injector 54 is increased to increase the anode gas supply rate. Therefore, in Example 1, the pressure value on the downstream side of the injector 54 can be increased with the period A (t11 to t12) shortened as compared with the period A (t01 to t02) in Comparative Example 1. The ratio of the period C to the drive cycle T ((t13 to t14)/(t11 to t14)) in Example 1 can therefore be greater than the ratio of the period C to the drive cycle T ((t03 to t04)/(t01 to t04)) in Comparative Example 1. As a result, the accuracy in the estimation of the amount of discharged anode gas can be improved. In Example 1, since the drive cycle T of the injector 54 is constant, but the anode gas supply rate is increased, the maximum pressure value in Example 1 is greater than that in Comparative Example 1.

Process 2

Figure 5:
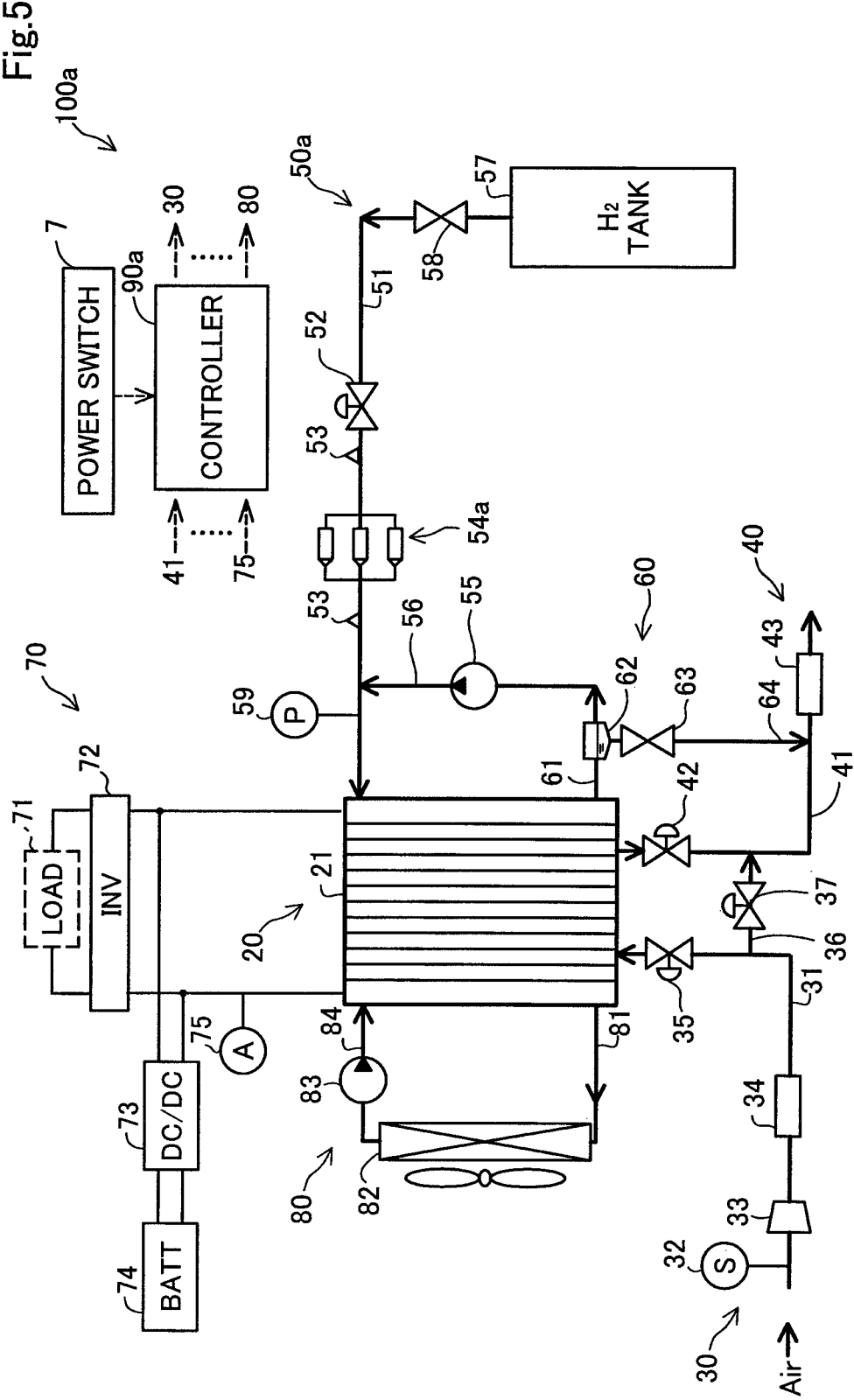
FIG. 5 shows a schematic configuration of a fuel cell system that carries out Process 2.

FIG. 5 shows a fuel cell system 100a, which carries out Process 2. The fuel cell system 100a differs from the fuel cell system 100 described above in that the fuel cell system 100a includes a plurality of injectors 54a arranged in parallel to one another in the anode gas supply channel 51 and on the upstream side of the fuel cell stack 20. In Process 2, a controller 90a controls each of the injectors 54a so that the drive cycle in the period for which the discharge valve 63 is closed is equal to the drive cycle in the period for which the discharge valve 63 is open. The controller 90a increases the number of driven injectors 54a in the period for which the discharge valve 63 is open as compared with the number in the period for which the discharge valve 63 is closed.

FIG. 6 describes an effect provided by Process 2. FIG. 6 is a timing chart showing the pressure value acquired from the pressure sensor 59, the opening or closing of the injectors 54a, the primary pressure acting on the injectors 54a, and the opening or closing of the discharge valve 63 in Comparative Example 2, in which Process 2 is not carried out, and Example 2, in which Process 2 is carried out. In Comparative Example 2, the number of driven injectors 54a is constant irrespective of whether the discharge valve 63 is open or closed.

During the opening of the discharge valve 63, the number of driven injectors 54a is increased to increase the rate at which the injectors 54a supply the anode gas. Therefore, in Example 2, the pressure value on the downstream side of the injectors 54a can be increased with the period A (t21 to t22) shortened as compared with the period A (t01 to t02) in Comparative Example 2. The ratio of the period C to the drive cycle T ((t23 to t24)/(t21 to t24)) in Example 2 can therefore be greater than the ratio of the period C to the drive cycle T ((t03 to t04)/(t01 to t04)) in Comparative Example 2. As a result, the accuracy in the estimation of the amount of discharged anode gas can be improved. In Example 2, since the drive cycle T of the injectors 54a is constant, but the anode gas supply rate is increased, the maximum pressure value in Example 2 is greater than that in Comparative Example 2.

Process 3

In Process 3, the controller 90 reduces the amount of electric power generated by the fuel cell stack 20 at least in the period A in the period for which the discharge valve 63 is open as compared with the amount of electric power generated in the period for which the discharge valve 63 is closed. The controller 90 maintains the same amounts of anode gas and cathode gas supplied to the fuel cell stack 20 both in the period for which the discharge valve 63 and in the period for which the discharge valve 63 is closed. The controller 90 reduces the current request value at least in the period A in the period for which the discharge valve 63 is open as compared with the current request value in the period for which the discharge valve 63 is closed to reduce the amount of electric power generated by the fuel cell stack 20. The controller 90 reduces the value of the current outputted from the fuel cell stack 20 in the period A during the discharge valve open-period, for example, by 20 A (ampere) as compared with the output current value during the discharge valve closed-period. The controller 90 compensates for the decrease in the amount of electric power generated by the fuel cell stack 20 by extracting an output from the battery 74. In Process 3, the controller 90 may reduce the amount of generated electric power also in each of the periods B and C in addition to the period A within the period for which the discharge valve 63 is open.

Figure 7:
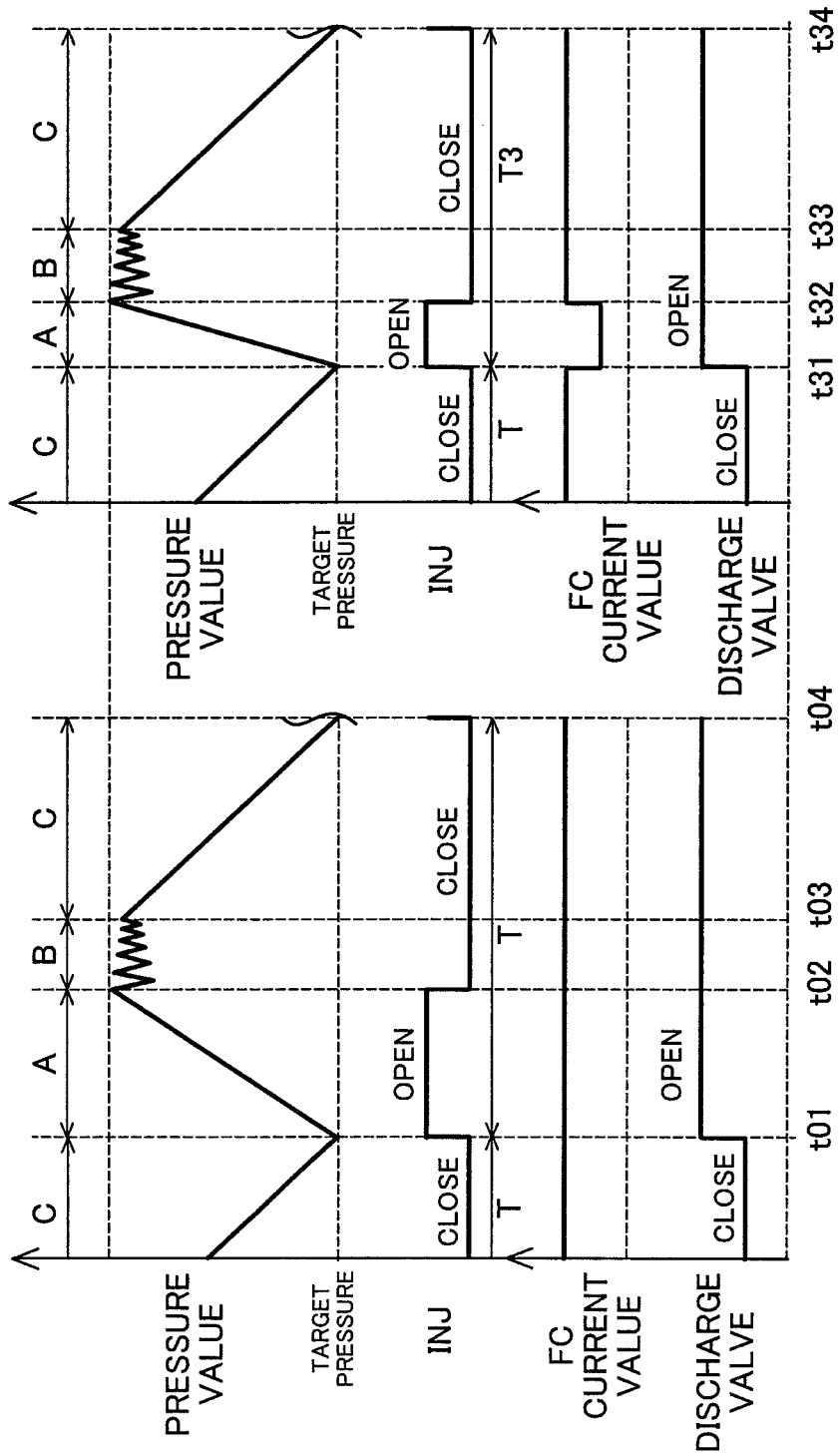
FIG. 7 describes an effect provided by Process 3.

FIG. 7 describes an effect provided by Process 3. FIG. 7 is a timing chart showing the pressure value acquired from the pressure sensor 59, opening or closing of the injector 54, the output current value (FC current value) representing the amount of electric power generated by the fuel cell stack 20, and opening or closing of the discharge valve 63 in Comparative Example 3, in which Process 3 is not carried out, and Example 3, in which Process 3 is carried out. The output current value is the result of the measurement performed by the current sensor 75. In Comparative Example 3, the FC current value is constant irrespective of whether the discharge valve 63 is open or closed.

When the amount of generated electric power is reduced, the amounts of anode gas and cathode gas consumed by the fuel cell stack 20 are reduced. In Example 3, the pressure on the downstream side of the injector 54 therefore increases within the period A. Therefore, in Example 3, the period A (t31 to t32) within the period for which the discharge valve 63 is open can be shorter than the period A in Comparative Example 3 (t01 to t02). In Example 3, the drive cycle T3 within the period for which the discharge valve 63 is open is shorter than the drive cycle T within the period for which the discharge valve 63 is closed.

In Example 3, in which the period A is shortened, the ratio of the period C to the drive cycle T3 ((t33 to t34)/(t31 to t34)) can be greater than the ratio of the period C to the drive cycle T ((t03 to t04)/(t01 to t04)) in Comparative Example 3. As a result, the accuracy in the estimation of the amount of discharged anode gas can be improved.

Process 4:

In Process 4, the controller 90 reduces the amount of electric power generated by the fuel cell stack 20 in the period C in the period for which the discharge valve 63 is open as compared with the amount of electric power generated in at least one of the period A and the period B in the period for which the discharge valve 63 is open. The controller 90 maintains the same amounts of anode gas and cathode gas supplied to the fuel cell stack 20 throughout the periods A to C. The controller 90 reduces the current request value in the period C in the period for which the discharge valve 63 is open as compared with the current request value at least in one of the period A and the period B to reduce the amount of electric power generated by the fuel cell stack 20. The controller 90 reduces the FC current value in the period C in the period for which the discharge valve 63 is open, for example, by 20 A (ampere) as compared with the FC current value at least in one of the period A and the period B. The controller 90 compensates for the decrease in the amount of electric power generated by the fuel cell stack 20 by extracting an output from the battery 74.

Figure 8:
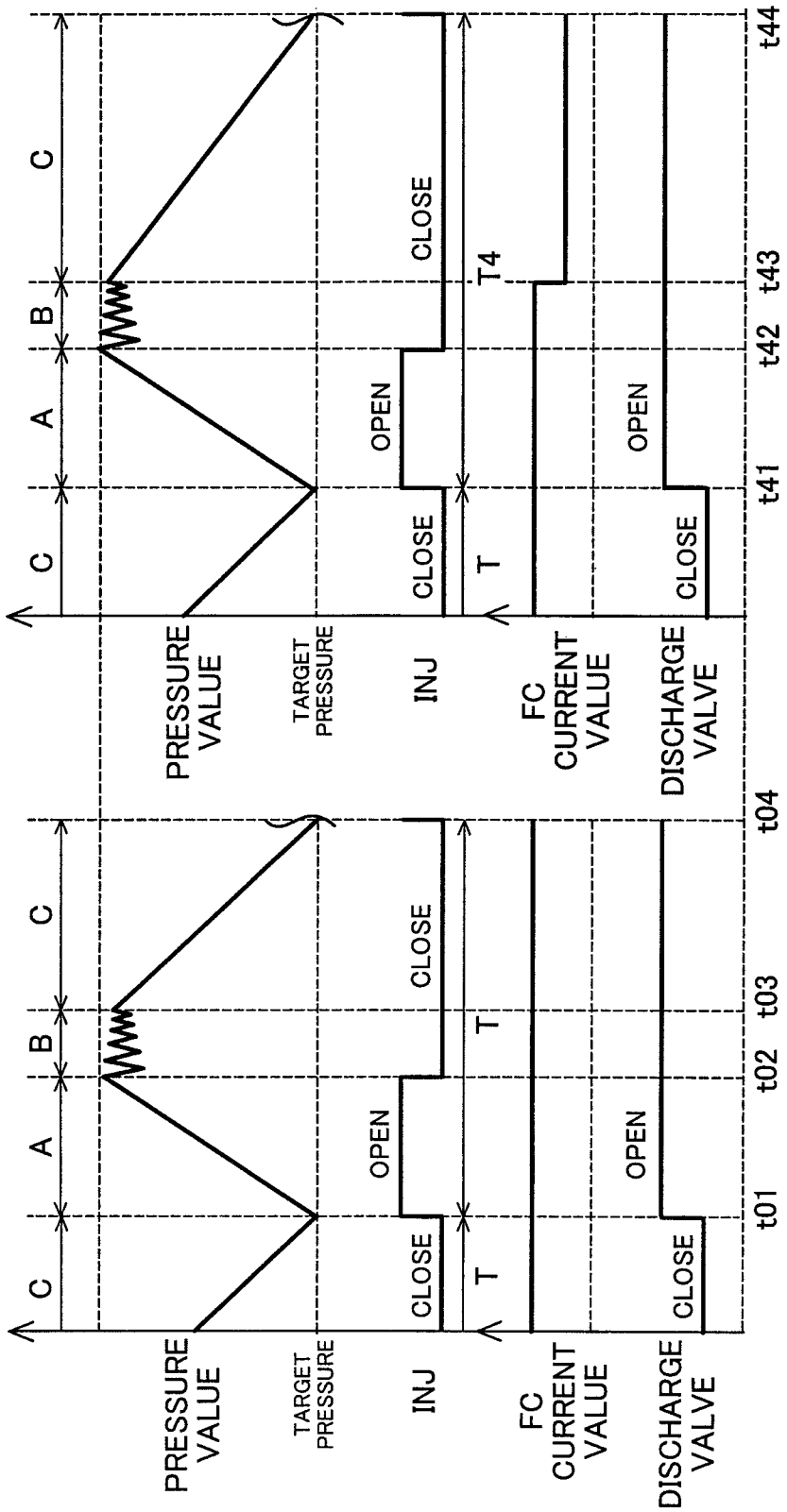
FIG. 8 describes an effect provided by Process 4.

FIG. 8 describes an effect provided by Process 4. FIG. 8 is a timing chart showing the pressure value acquired from the pressure sensor 59, opening or closing of the injector 54, the output current value representing the amount of electric power generated by the fuel cell stack 20, and opening or closing of the discharge valve 63 in Comparative Example 4, in which Process 4 is not carried out, and Example 4, in which Process 4 is carried out. In Example 4, the amount of generated electric power in the period C in the period for which the discharge valve 63 is open is reduced as compared with the amounts of generated electric power in the periods A and B in the period for which the discharge valve 63 is closed. In Comparative Example 4, the FC current value is constant.

When the amount of generated electric power is reduced in the period C in the period for which the discharge valve 63 is open, the amounts of anode gas and cathode gas consumed by the fuel cell stack 20 decrease, whereby the rate of the decrease in the pressure on the downstream side of the injector 54 decreases. The period C in the period for which the discharge valve 63 is open (t43 to t44) is therefore longer than the period C in Comparative Example 4 (t03 to t04). In Example 4, since the period C in the period for which the discharge valve 63 is open increases, the drive cycle T4 in Example 4 is longer than the drive cycle T in the period for which the discharge valve 63 is closed.

In Example 4, in which the period C is prolonged, the ratio of the period C to the drive cycle T4 ((t43 to t44)/(t41 to t44)) can be increased as compared with the ratio of the period C to the drive cycle T in Comparative Example 4 ((t03 to t04)/(t01 to t04)). As a result, the accuracy in the estimation of the amount of discharged anode gas can be improved.

Process 5:

In Process 5, the controller 90 prolongs the drive cycle of the injector 54 in the period for which the discharge valve 63 is open as compared with the drive cycle in the period for which the discharge valve 63 is closed with the ratio of the period A to the drive cycle maintained.

Figure 9:
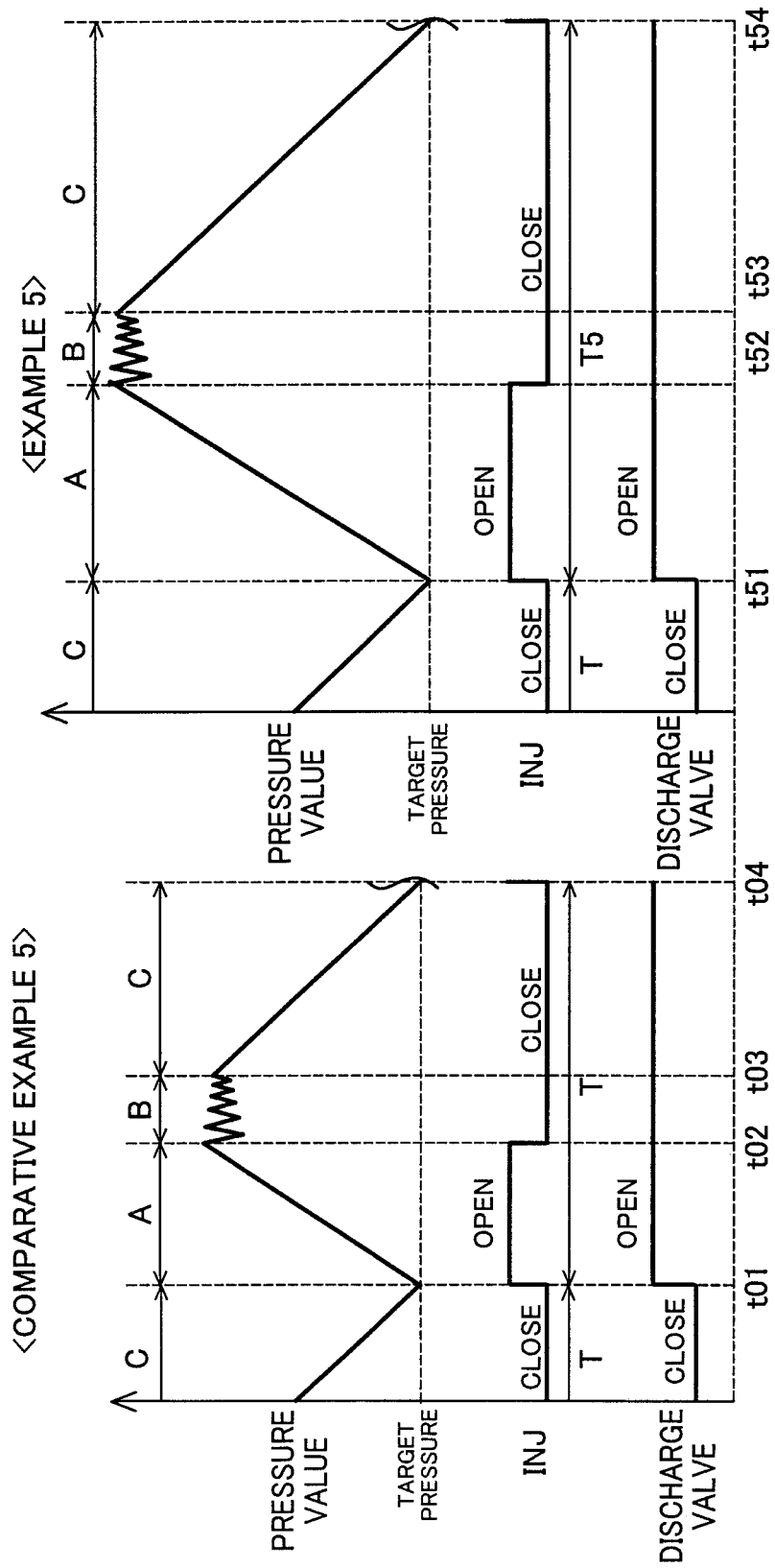
FIG. 9 describes an effect provided by Process 5.

FIG. 9 describes an effect provided by Process 5. FIG. 9 is a timing chart showing the pressure value acquired from the pressure sensor 59, opening or closing of the injector 54, and opening or closing of the discharge valve 63 in Comparative Example 5, in which Process 5 is not carried out, and Example 5, in which Process 5 is carried out. In Example 5, the period for which the injector 54 performs the injection is prolonged, and the maximum pressure value therefore increases. In Comparative Example 5, the drive cycle and the ratio of the period A to the drive cycle are constant irrespective of whether the discharge valve 63 is open or closed.

The length of the period B (t52 to t53) is roughly constant irrespective of the drive cycle, as described above. In view of the fact described above, in Example 5, the drive cycle of the injector 54 is prolonged to a drive cycle T5, which is longer than the drive cycle T in the period for which the discharge valve 63 is closed, with the ratio of the anode gas injection period to the drive cycle maintained, whereby the ratio of the period C to the drive cycle T5 ((t53 to t54)/(t51 to t54)) can be increased as compared with the ratio of the period C to the drive cycle T in Comparative Example 5 ((t03 to t04)/(t01 to t04)). As a result, the accuracy in the estimation of the amount of discharged anode gas can be improved.

Process 6

In process 6, the controller 90 controls the injector 54 so that the amplitude of the pressure pulsation produced by the injector 54 in the period for which the discharge valve 63 is open is greater than the amplitude in the period for which the discharge valve 63 is closed. In Process 6, the controller 90 controls the injector 54 in such a way that the amplitude of the pressure pulsation in the period for which the discharge valve 63 is open is, for example, 1.5 times the amplitude of the pressure pulsation in the period for which the discharge valve 63 is closed.

Figure 10:
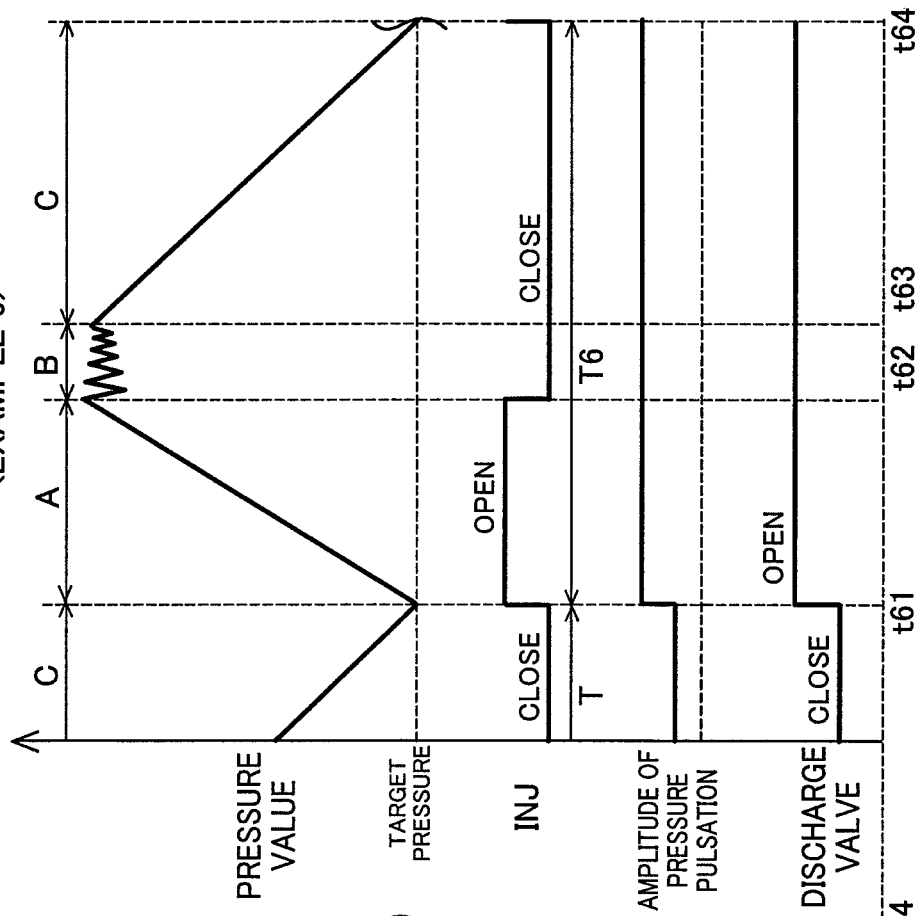
FIG. 10 describes an effect provided by Process 6.

FIG. 10 describes an effect provided by Process 6. FIG. 10 is a timing chart showing the pressure value acquired from the pressure sensor 59, opening or closing of the injector 54, and the amplitude of the pressure pulsation produced by the injector 54 in Comparative Example 6, in which Process 6 is not carried out, and Example 6, in which Process 6 is carried out. In Comparative Example 6, the amplitude of the pressure pulsation is constant irrespective of whether the discharge valve 63 is open or closed.

The length of the period B (t62 to t63) is roughly constant irrespective of the drive cycle, as described above. In view of the fact described above, in Example 6, the amplitude of the pressure pulsation can be increased to increase the ratio of the period C to the drive cycle T6 ((t63 to t64)/(t61 to t64)) as compared with the ratio of the period C to the drive cycle T in Comparative Example 6 ((t03 to t04)/(t01 to t04)). As a result, the accuracy in the estimation of the amount of discharged anode gas can be improved.

Second Embodiment

In a second embodiment, the controller 90 corrects the lower limit of the amount of pressure decrease in the period C in the period for which the discharge valve 63 is open to a value smaller than zero to correct the amount of pressure decreases in the period C.

Figure 11:
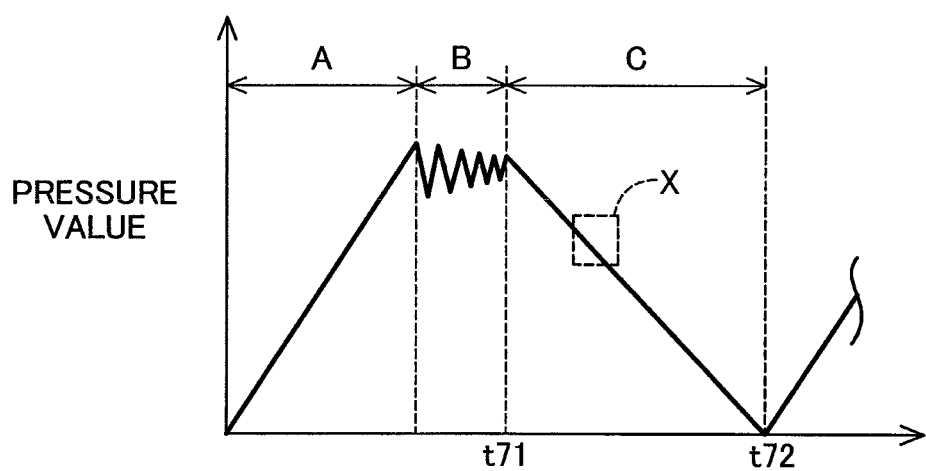
FIG. 11 shows the pressure value acquired with the pressure sensor.

FIG. 11 shows the pressure value acquired with the pressure sensor 59. In FIG. 11, the pressure value linearly decreases in the period C (points of time t71 to t72).

Figure 12:
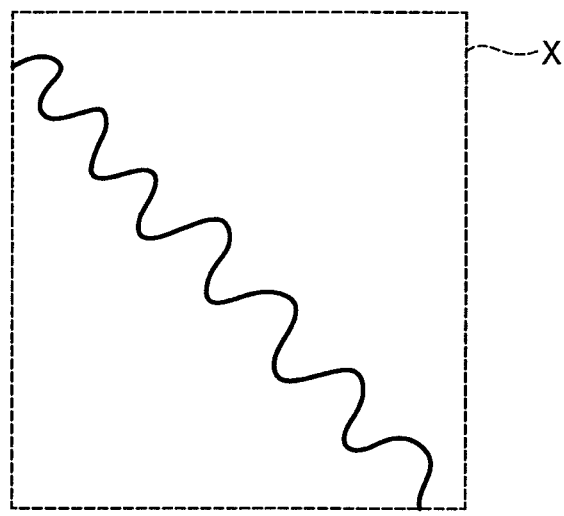
FIG. 12 is an enlarged view of the portion X in a period C shown in FIG. 11.

FIG. 12 is an enlarged view of the portion X in the period C shown in FIG. 11. In the period C, the pressure value, in more detail, gradually decreases while repeatedly increasing and decreasing, as shown in FIG. 12. The increases and decreases in the pressure value can occur due, for example, to the rotation of the hydrogen pump 55, which is an accessory device of the fuel cell system 100, and variation in the number of revolutions of the hydrogen pump 55.

Figure 13:
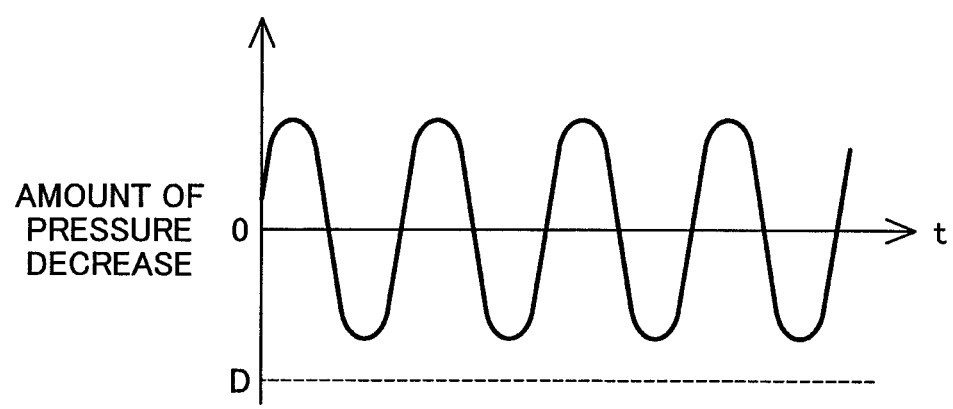
FIG. 13 is a conceptual view showing the amount of pressure decrease in the portion X.

FIG. 13 is a conceptual view showing the amount of pressure decrease in the portion X. The increases and decreases in the pressure value possibly cause the amount of pressure decrease per unit time to be a negative value. The cumulative amount of pressure decrease per unit time, that is, the integrated value of the pressure decrease possibly deviates from a correct value.

In the present embodiment, the controller 90 corrects the lower limit D of the amount of pressure decrease to a value smaller than zero and calculates the amount of pressure decrease. The amount of discharged anode gas calculated based on the amount of pressure decrease can therefore be a positive value. As a result, the amount of pressure decrease in the period C can be more accurately calculated, whereby the accuracy in the estimation of the amount of discharged anode gas can be improved by a greater degree.

Third Embodiment

Figure 14:
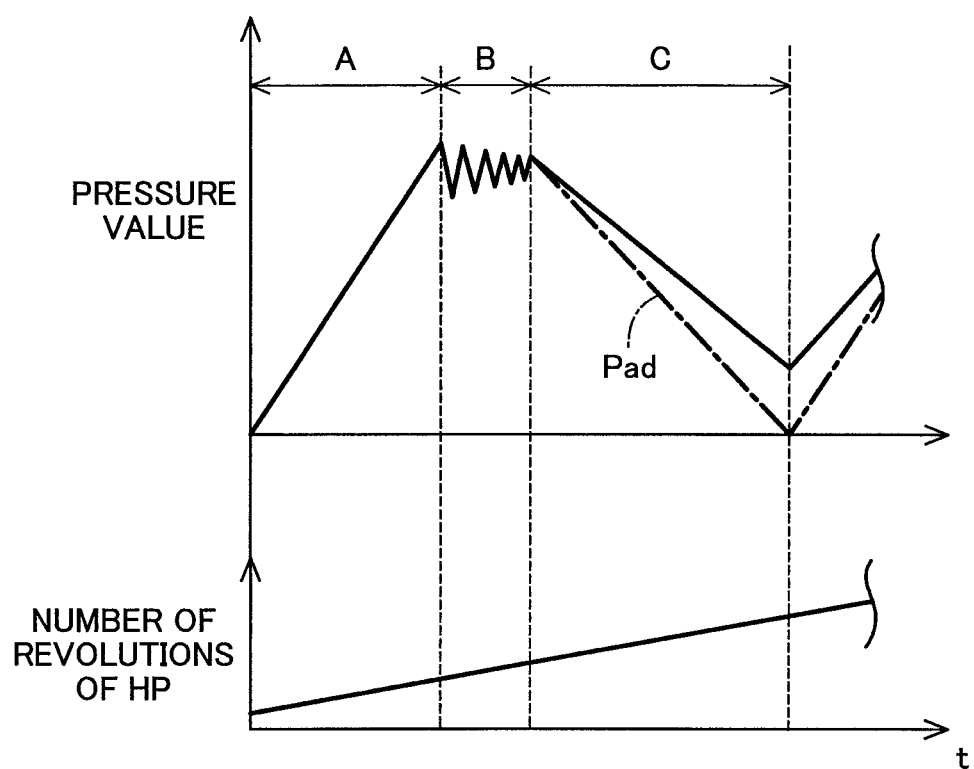
FIG. 14 shows the pressure value acquired from the pressure sensor and the number of revolutions of a hydrogen pump.

FIG. 14 is a timing chart showing the pressure value acquired from the pressure sensor 59 and the number of revolutions of the hydrogen pump 55. The broken line Psd in the period C represents the pressure value acquired from the pressure sensor 59 in a case where the number of revolutions of the hydrogen pump 55 is constant.

When number of revolutions of the hydrogen pump 55 increases in the period C, as shown in FIG. 14, the amount of anode gas supplied to the fuel cell stack 20 via the anode gas supply channel 51 increases. The pressure value therefore increases as compared with the case where the number of revolutions of the hydrogen pump 55 is constant. Although not shown, when the number of revolutions of the hydrogen pump 55 decreases in the period C, the amount of anode gas supplied to the fuel cell stack 20 decreases. The pressure value therefore decreases as compared with the case where the number of revolutions of the hydrogen pump 55 is constant.

As described above, the pressure value acquired from the pressure sensor 59 is affected not only by the amount of anode gas discharged via the discharge valve 63 but by variation in the number of revolutions of the hydrogen pump 55, which is an accessory device in the fuel cell system 100.

Figure 15:
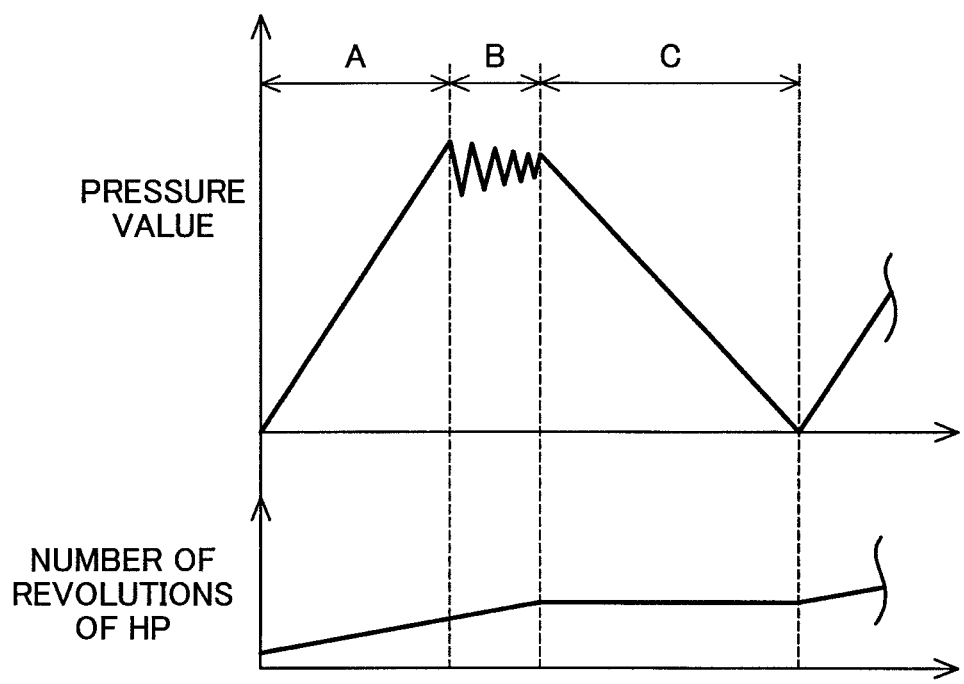
FIG. 15 shows the pressure value and the number of revolutions of the hydrogen pump in a third embodiment.

FIG. 15 is a timing chart showing the pressure value and the number of revolutions of the hydrogen pump 55 in the third embodiment. In the present embodiment, the controller 90 causes the hydrogen pump 55 to operate at constant number of revolutions in the period for which the discharge valve 63 is open, at least in the period C.

According to the present embodiment, which can reduce the variation of the pressure due to the accessory device in the fuel cell system 100, the amount of pressure decrease in the period C can be more accurately calculated. As a result, the accuracy in the estimation of the amount of discharged anode gas can be improved by a greater degree.

Other Embodiments

The fuel cell systems 100 and 100a may each include a second controller that opens the injector 54 or the injectors 54a to inject the anode gas when the pressure in the anode gas supply channel 51 becomes lower than the target pressure. For example, in the case where the second controller opens the valve of the injector 54 in the period C, the controllers 90 and 90a may each calculate the amount of pressure decrease for the estimation of the amount of discharged anode gas after the elapse of the periods A and B, which occur when the second controller opens the valve of the injector 54. As a result, the accuracy in the estimation of the amount of discharged anode gas can be improved by a greater degree.

The controller 90 may store the relationship determined by an experiment or a simulation between variation in the number of revolutions of the hydrogen pump 55 and variation of the pressure. The controller 90 may use the variation in the number of revolutions of the hydrogen pump 55 in the period C and the relationship described above to subtract the change in the pressure value resulting from variation in the number of revolutions of the hydrogen pump 55 from the amount of pressure decrease. The pressure value is likely to change in accordance not only with the amount of anode gas discharged via the discharge valve 63 but with variation in the number of revolutions of the hydrogen pump 55, which is an accessory device in the fuel cell system 100. The amount of pressure decrease in the period C can therefore be more accurately calculated. The accuracy in the estimation of the amount of discharged anode gas can therefore be improved by a greater degree.

Processes described above, except Process 2, may be carried out by using either the fuel cell system 100 or 100a. Processes may be combined with each other.

In a case where the fuel cell system 100 or 100a is incorporated in a vehicle, the vehicle may be a connected car. A connected car is an automobile incorporating a communication device and capable of receiving service over communication with a cloud. In this case, for example, a variety of pieces of information to be stored in the controller 90 or 90a may be acquired over the communication. The vehicle may be a ship, a train, or any other moving object.

The disclosure is not limited to the embodiments described above and can be achieved in a variety of configurations to the extent that they do not depart from the substance of the present disclosure. For example, the technical features in the embodiments can be replaced with other features or combined with each other as appropriate to solve part or entirety of the problems described above or achieve part or entirety of the effects described above. Further, the components in the embodiments described above other than the components described in the independent claim are additional components and can be omitted as appropriate. For example, the present disclosure may be achieved in the aspects described below.

(1) According to one of the disclosure, a fuel cell system is provided. The fuel cell system includes: a fuel cell configured to generate electric power by receiving supply of an anode gas and a cathode gas; an anode gas supply channel connected to the fuel cell and through which the anode gas supplied to the fuel cell flows; an anode gas discharge channel connected to the fuel cell and through which the anode gas discharged from the fuel cell flows; an injector located on the anode gas supply channel and configured to inject the anode gas; a pressure sensor located on the downstream side of the injector in the anode gas supply channel or on the anode gas discharge channel; a discharge valve located on the anode gas discharge channel; and a controller configured to control the injector and the discharge valve, the controller is configured to control the injector so that the pressure on the downstream side of the injector in the anode gas supply channel does not become lower than a predetermined target pressure; close the discharge valve when an amount of the anode gas discharged within a first period during a discharge valve open-period reaches a target discharge amount, the amount of discharged anode gas being estimated based on an amount of decrease in a pressure value acquired from the pressure sensor, the first period being a period, from a point of time when a period after the injector stops injecting the anode gas until variation of the pressure acquired from the pressure sensor falls within a predetermined range elapses, to a point of time when the injector next starts injecting the anode gas; and increase a ratio of the first period to the drive cycle by controlling, during the discharge valve open-period, at least one of an anode gas supply rate of the injector, an amount of electric power generated by the fuel cell, and a drive cycle that is a period from the start of the injection performed by the injector to the next start of the injection.

According to the fuel cell system described above, increasing the ratio of the first period to the drive cycle allows improvement in the accuracy in the estimation of the amount of discharged anode gas.

(2) In the fuel cell system of the above aspect, the fuel cell system may further include a pressure adjusting valve located on an upstream side of the injector in the anode gas supply channel and configured to adjust the pressure of the anode gas between the pressure adjusting valve and the injector, and the controller may be configured to control the injector so that the drive cycle is constant both in a discharge valve closed-period and the discharge valve open-period; and control the pressure adjusting valve to increase the pressure in the anode gas supply channel between the pressure adjusting valve and the injector during the discharge valve open-period as compared with the pressure during the discharge valve closed-period to increase the anode gas supply rate of the injector.

According to the form described above, in the discharge valve open-period, increasing the pressure on the upstream side of the injector increases the anode gas supply rate. Since the drive cycle of the injector is constant both in the discharge valve closed-period and the discharge valve open-period, the ratio of the first period to the drive cycle can be increased by shortening the injector injection period. As a result, the accuracy in the estimation of the amount of discharged anode gas can be improved.

(3) In the form described above, the fuel cell system may further include the injector in plurality arranged in parallel to one another on an upstream side of the fuel cell in the anode gas supply channel, and the controller may be configured to control the injector so that the drive cycle is constant both in the discharge valve closed-period and the discharge valve open-period; and increase the number of driven injectors out of the plurality of the injectors during the discharge valve open-period as compared with the number during the discharge valve closed-period to increase the anode gas supply rate of the injector.

According to the form described above, in the discharge valve open-period, increasing the number of driven injectors increases the anode gas supply rate. Since the drive cycle of the injector is constant both in the discharge valve closed-period and the discharge valve open-period, the ratio of the first period to the drive cycle can be increased by shortening the injector injection period. As a result, the accuracy in the estimation of the amount of discharged anode gas can be improved.

(4) In the fuel cell system of the above aspect, the controller may be configured to reduce the amount of electric power generated by the fuel cell at least a period for which the anode gas is injected during the discharge valve open-period as compared with the amount of electric power generated during the discharge valve closed-period.

According to the form described above, reducing the amount of electric power generated by the fuel cell within the period for which the anode gas is injected by the injector increases the rate at which the pressure on the downstream side of the injector increases. The injector injection period can therefore be shortened, whereby the ratio of the first period to the drive cycle can be increased. As a result, the accuracy in the estimation of the amount of discharged anode gas can be improved.

(5) In the fuel cell system of the above aspect, the controller may be configured to reduce the amount of electric power generated by the fuel cell within the first period during the discharge valve open-period as compared with the amount of electric power generated at least in one of the period for which the anode gas is injected by the injector during the discharge valve open-period and the period from the point of time when the injector stops injecting the anode gas to the point of time when the variation of the pressure acquired from the pressure sensor falls within the predetermined range.

According to the form described above, since the rate at which the pressure on the downstream side of the injector in the first period decreases, the first period can be prolonged. The ratio of the first period to the drive cycle can therefore be increased. As a result, the accuracy in the estimation of the amount of discharged anode gas can be improved.

(6) In the fuel cell system of the above aspect, the controller may be configured to prolong the drive cycle during the discharge valve open-period as compared with the drive cycle in the period for which the discharge valve is closed with the ratio of the anode gas injection period to the drive cycle maintained.

According to the form described above, prolonging the drive cycle can prolong the first period. Since the period from the point of time when the injector stops injecting the anode gas to the point of time when the variation of the pressure acquired from the pressure sensor falls within the predetermined range is roughly constant irrespective of the drive cycle, the ratio of the first period to the drive cycle can be increased. As a result, the accuracy in the estimation of the amount of discharged anode gas can be improved.

(7) In the fuel cell system of the above aspect, the controller may be configured to control the drive cycle of the injector so that the amplitude of pressure pulsation produced by the injector in the anode gas supply channel and on the downstream side of the injector during the discharge valve open-period is greater than the amplitude in the period for which the discharge valve is closed.

According to the form described above, increasing the amplitude of the pressure pulsation produced by the injector allows the drive cycle to be prolonged and hence the first period to be prolonged. Since the period from the point of time when the injector stops injecting the anode gas to the point of time when the variation of the pressure acquired from the pressure sensor falls within the predetermined range is roughly constant irrespective of the drive cycle, the ratio of the first period to the drive cycle can be increased. As a result, the accuracy in the estimation of the amount of discharged anode gas can be improved.

(8) In the fuel cell system of the above aspect, the fuel cell system may further include a circulation channel connected to a position on the anode gas supply channel and on the downstream side of the injector to the anode gas discharge channel; and an anode gas pump located on the circulation channel, and the controller may be further configured to control the anode gas pump so that the number of revolutions of the anode gas pump is constant at least within the first period during the discharge valve open-period.

According to the form described above, the variation of the pressure resulting from the anode gas pump can be reduced, whereby the amount of pressure decrease within the first period can be more accurately calculated. The accuracy in the estimation of the amount of discharged anode gas can therefore be improved by a greater degree.

(9) In the fuel cell system of the above aspect, the fuel cell system may further include a circulation channel connected to a position on the anode gas supply channel and on the downstream side of the injector to the anode gas discharge channel; and an anode gas pump located on the circulation channel, and the controller may be configured to correct the lower limit of the amount of decrease in the pressure value within the first period during the discharge valve open-period to a value smaller than zero and calculate the amount of decrease in the pressure value within the first period.

According to the form described above, the amount of discharged anode gas calculated based on the amount of pressure decrease can be a positive value. The amount of pressure decrease within the first period can therefore be more accurately calculated, whereby the accuracy in the estimation of the amount of discharged anode gas can be improved by a greater degree.

What is claimed is:

1. A fuel cell system comprising:
   a fuel cell configured to generate electric power by receiving supply of an anode gas and a cathode gas;
   an anode gas supply channel connected to the fuel cell and through which the anode gas supplied to the fuel cell flows;
   an anode gas discharge channel connected to the fuel cell and through which the anode gas discharged from the fuel cell flows;
   an injector located on the anode gas supply channel and configured to inject the anode gas;
   a pressure sensor located on a downstream side of the injector in the anode gas supply channel or on the anode gas discharge channel;
   a discharge valve located on the anode gas discharge channel; and
   a controller configured to control the injector and the discharge valve, wherein the controller is programmed to:
      control the injector so that pressure on the downstream side of the injector in the anode gas supply channel does not become lower than a predetermined target pressure,
      close the discharge valve when an amount of the anode gas discharged within a first period during a discharge valve open-period reaches a target discharge amount, the amount of discharged anode gas being estimated based on an amount of decrease in a pressure value acquired from the pressure sensor, the first period being a period from a point of time when a period after the injector stops injecting the anode gas until variation of the pressure acquired from the pressure sensor falls within a predetermined range elapses, to a point of time when the injector next starts injecting the anode gas, and
      increase a ratio of the first period to a drive cycle by controlling, during the discharge valve open-period, at least one of an anode gas supply rate of the injector, an amount of electric power generated by the fuel cell, or the drive cycle in a period from start of the injection performed by the injector to next start of the injection.

2. The fuel cell system according to claim 1, further comprising:
   a pressure adjusting valve located on an upstream side of the injector in the anode gas supply channel and configured to adjust the pressure of the anode gas between the pressure adjusting valve and the injector,
   wherein the controller is programmed to:
      control the injector so that the drive cycle is constant both in a discharge valve closed-period and the discharge valve open-period, and
      control the pressure adjusting valve to increase the pressure in the anode gas supply channel between the pressure adjusting valve and the injector during the discharge valve open-period as compared with the pressure during the discharge valve closed-period to increase the anode gas supply rate of the injector.

3. The fuel cell system according to claim 1, wherein
   the injector is one injector in a plurality of injectors arranged in parallel to one another on an upstream side of the fuel cell in the anode gas supply channel, and
   the controller is programmed to:
      control the one injector so that the drive cycle is constant both in the discharge valve closed-period and the discharge valve open-period, and
      increase the number of driven injectors out of the plurality of injectors during the discharge valve open-period as compared with the number of driven injectors out of the plurality of injectors during the discharge valve closed-period to increase the anode gas supply rate of the one injector.

4. The fuel cell system according to claim 1,
   wherein the controller is programmed to reduce the amount of electric power generated by the fuel cell at least in a period for which the anode gas is injected during the discharge valve open-period as compared with the amount of electric power generated during the discharge valve closed-period.

5. The fuel cell system according to claim 1,
   wherein the controller is programmed to reduce the amount of electric power generated by the fuel cell within the first period during the discharge valve open-period as compared with the amount of electric power generated in at least one of a period for which the anode gas is injected by the injector during the discharge valve open-period or the period from the point of time when the injector stops injecting the anode gas to the point of time when the variation of the pressure acquired from the pressure sensor falls within the predetermined range.

6. The fuel cell system according to claim 1,
   wherein the controller is programmed to prolong the drive cycle during the discharge valve open-period as compared with the drive cycle in a period for which the discharge valve is closed with a ratio of a period for which the anode gas is injected to the drive cycle maintained.

7. The fuel cell system according to claim 1,
   wherein the controller is programmed to control the drive cycle of the injector so that an amplitude of pressure pulsation produced by the injector in the anode gas supply channel and on the downstream side of the injector during the discharge valve open-period is greater than the amplitude of pressure pulsation produced by the injector in a period for which the discharge valve is closed.

8. The fuel cell system according to claim 1, further comprising:
   a circulation channel connected to a position on the anode gas supply channel and on the downstream side of the injector to the anode gas discharge channel; and
   an anode gas pump located on the circulation channel, wherein the controller is further programmed to control the anode gas pump so that the number of revolutions of the anode gas pump is constant at least within the first period during the discharge valve open-period.

9. The fuel cell system according to claim 1, further comprising:
a circulation channel connected to a position on the anode gas supply channel and on the downstream side of the injector to the anode gas discharge channel; and
an anode gas pump located on the circulation channel, wherein the controller is programmed to:
correct a lower limit of the amount of decrease in the pressure value within the first period during the discharge valve open-period to a value smaller than zero, and
calculate the amount of decrease in the pressure value within the first period.

10. A method of controlling a fuel cell system, the method comprising:
controlling an injector so that pressure on a downstream side of the injector does not become lower than a predetermined target pressure, wherein the injector is configured to supply an anode gas through an anode gas supply channel to a fuel cell;
closing a discharge valve when an amount of the anode gas discharged from the fuel cell within a first period during a discharge valve open-period reaches a target discharge amount, the amount of discharged anode gas being estimated based on an amount of decrease in a pressure value on the downstream side of the injector, the first period being a period from a point of time when a period after the injector stops injecting the anode gas until variation of the pressure value on the downstream side of the injector falls within a predetermined range elapses, to a point of time when the injector next starts injecting the anode gas, wherein the discharge valve is configured to control the amount of the anode gas discharged from the fuel cell; and
increasing a ratio of the first period to a drive cycle by controlling, during the discharge valve open-period, at least one of an anode gas supply rate of the injector, an amount of electric power generated by the fuel cell, or the drive cycle in a period from a start of the injection performed by the injector to a next start of the injection.

* * * * *